United States Patent
Fujimoto (10) Patent No.: US 7,071,957 B2
(45) Date of Patent: Jul. 4, 2006

(54) IMAGE FORMING APPARATUS AND COLOR-MISREGISTRATION CORRECTING METHOD

(75) Inventor: Akihiro Fujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 10/245,648

(22) Filed: Sep. 18, 2002

(65) Prior Publication Data

US 2003/0052959 A1  Mar. 20, 2003

(30) Foreign Application Priority Data

Sep. 20, 2001   (JP) .................... 2001-286987

(51) Int. Cl.
  *G03G 15/01*  (2006.01)
  *G02B 26/10*  (2006.01)

(52) U.S. Cl. .................. 347/116; 347/234
(58) Field of Classification Search ........... 347/115, 347/116, 232, 234; 399/299, 301; 359/204
  See application file for complete search history.

(56) References Cited

U.S. PATENT DOCUMENTS 4,591,903 A    5/1986  Kawamura et al. ........ 358/75
5,631,686 A *  5/1997  Castelli et al. ............ 347/116
6,735,401 B1 * 5/2004  Kajiwara et al.

FOREIGN PATENT DOCUMENTS

| JP | 04-051829 B2 | 8/1992 |
| JP | 04-313776 A | 11/1992 |
| JP | 9-109453 A * | 4/1997 |

* cited by examiner

*Primary Examiner*—Arthur T. Grimley
*Assistant Examiner*—Ryan Gleitz
(74) *Attorney, Agent, or Firm*—Fitzpatrick, Cella, Harper & Scinto (57) ABSTRACT

To provide an image forming apparatus having a plurality of optical systems each simultaneously scanning two stations by one polygon mirror to minimize conveyance-directional color misregistration of an intermediate transferring belt. An electrophotographic color laser printer connected with a host computer is provided with a scanner unit common to first and second stations, a scanner unit common to third and fourth stations, and a registration-position detector for reading an image pattern formed on an intermediate transferring belt and detecting a registration position of an image of a laser beam. The plane phase of the polygon mirror in the first and second stations is controlled and central positions of image patterns by two laser beams are detected to correct the misregistration between these central positions.

12 Claims, 9 Drawing Sheets

IMAGE FORMING APPARATUS AND COLOR-MISREGISTRATION CORRECTING METHOD

BACKGROUND OF THE INVENTION

1. Field of the Invention

The present invention relates to an image forming apparatus using an electrophotographic process, particularly to a color-image forming apparatus for forming different color images by using a plurality of laser beams and a method for correcting a color-misregistration in the image forming apparatus.

2. Related Background Art

In the case of a conventional laser printer using an electrophotographic system, a laser beam modulated in accordance with an image signal is reflected by a scanner having a polygon mirror (rotational polygon mirror) and caused to scan the surface of a photosensitive member to form an image. The photosensitive member often used has a drum-shape and is generally referred to as a photosensitive drum. At the time of applying the system to a color laser printer, a color image is formed on a sheet-like recording medium by superimposing a plurality of images of different colors (e.g. four colors of yellow (Y), magenta (M), cyan (C), and black (BK)). Following configurations are available for achieving the superimposition technique.

As one of the configurations, a latent image is formed by scanning the surface of a photosensitive drum with a first color-image signal, a developer is attached to the latent image in order to visualize the latent image, the latent image is transferred to recording paper, then the photosensitive drum is cleaned, a latent image is formed again by scanning the surface of the same photosensitive drum with a second color-image signal, and the above development and transferring steps are carried out. The developer of the second color-image signal is a developer for a second color. Then, the above steps are repeated for third and fourth color-image signals in the same manner. Thus, one image is formed by superimposing a plurality of images developed on the same recording paper.

Moreover, in the case of another configuration, one image is recorded by using photosensitive drums in the number equal to a plurality of color-image signals, forming respective latent images on the photosensitive drums corresponding to the color-image signals one to one, visualizing and developing the latent images with different-color developers, and successively transferring the developed images to recording paper. In this case, one laser, one scanner, one BD (Beam Detect) sensor for detecting the image write timing of the laser, and one photosensitive drum are commonly prepared for one image signal. Therefore, when there are a plurality of image signal to be superimposed, it is necessary to use lasers, scanners and photosensitive drums of the same number as that of the image signals.

In the case of the former configuration, an electrophotographic process including a series of charging, exposure, development, transfer, and cleaning is applied to a first color-image signal and then, the same process is applied to a second color-image signal again, and moreover, the same process must be applied to a third color-image signal and a fourth color-image signal in time series. Thus, the print time for one sheet becomes prolonged.

The latter configuration has an advantage that printing can be performed in a short time compared to the former configuration. However, it is necessary to prepare lasers, scanners, and photosensitive drums of the same number as that of color-image signals used and therefore, an apparatus increases in size and becomes expensive.

Moreover, because images of respective colors are superimposed in either of the above configurations, the so-called color misregistration due to mismatch between color image positions tends to occur. Particularly, in the case of the latter configuration, the registration of color images is hardly matched because each color image is formed by using a different scanner and a different photosensitive drum. Therefore, the registration matching is performed for every color. For example, means is used which performs correction by forming a registration-detecting pattern image on an intermediate transferring belt (ITB) or electrostatic transportation belt (ETB), reading the image by a registration-detecting sensor, and feeding back the image to the write-start position of the image.

The registration-detecting sensor irradiates the registration-detecting image pattern formed on the ITB or ETB with a light emitted from a light source, and focuses and reads the reflected light by a light-receiving sensor. Then, a temporal intensity change of a signal from the light-receiving sensor when the registration-detecting pattern passes is detected as positional-misregistration information and electrical processing is applied to the information.

Usually, the rotational speed of the scanner is raised in order to shorten the printing time of laser printer. The conventional scanner rotational speed of a laser printer is normally set to a high-speed rotation of 20,000 rpm or higher. Moreover, the scanner uses a polygon mirror. When there is an error of a deflection angle, a positional fluctuation occurs on a photosensitive drum depending on the optical path length of a laser beam. Therefore, as for the scanner, it is necessary that the inclination error of each face of the polygon mirror is very small and the vibration of the polygon mirror due to high-seed rotation is little.

Therefore, to obtain stable high-speed rotation of the polygon mirror, a large motor is necessary and it is also necessary to limit the inclination error of each face of the polygon mirror. Thus, an accurate processing technique is required for a scanner fabrication process. Therefore, the fabrication yield is low and the cost is greatly increased.

Moreover, the above apparatus provided with a plurality of scanners inadvantageously becomes large-scaled and expensive. Therefore, to cut down the cost, the following are proposed: an apparatus using a common scanner for a plurality of colors (Japanese Patent Publication No. 4-51829) and an apparatus using a common scanner and providing a BD sensor only for one light source among a plurality of light sources (Japanese Patent Laid-Open No. 4-313776). In the case of the apparatus disclosed in Japanese Patent Laid-Open No. 4-313776, a plurality of light sources are constituted so that they are simultaneously allowed to scan the photosensitive member by the aid of different faces of a polygon mirror and light sources other than the light source provided with a BD sensor can be estimated by a BD signal of the light source provided with the BD sensor because the rotational phase difference (angle difference) of the polygon mirror is previously known.

As described above, in the case of a color-image forming apparatus normally provided with a plurality of polygon mirrors to form a color image by scanning different photosensitive drums for each of colors, PLL control is performed so that the numbers of revolutions of the scanner motors are made equal. Moreover, to accurately adjust the conveyance-directional write-start position of each color, rotation is controlled while keeping the plane phase of each polygon mirror in a specific positional relation.

In the case of a conventional image-forming apparatus, however, it is impossible to correct the write-start position of a misregistration amount equal to or less than one line in the conveyance direction between a plurality of colors to be scanned by one polygon mirror. Therefore, to correct the misregistration amount equal to or less than one line in the conveyance direction between a plurality of colors to be scanned by different polygon mirrors, if the misregistration amount equal to or less than one line between a plurality of colors to be scanned by the above one polygon mirror is large, the above conveyance-directional color misregistration amount between a plurality of colors to be scanned by different polygon mirrors is superimposed and thereby, the color misregistration amount between colors (four colors) may be increased.

SUMMARY OF THE INVENTION

The present invention is achieved to solve the above problems and its object is to provide a low-cost and color-misregistration-free high-quality image-forming apparatus capable of decreasing the number of BD sensors and its color-misregistration correcting method.

The present invention provides an image forming apparatus, including: a plurality of optical systems each having two light-beam generating means; a photosensitive member on whose surface a latent image is formed by exposure with a light beam emitted from the light-beam generating means in each of the optical systems; a single rotational polygon mirror for each of the optical systems, the polygon mirror making light beams emitted from two light-beam generating means of each of the optical systems deflect and scan different surfaces of the photosensitive member in directions opposite to each other at the same time; developing means for visualizing the latent image on the photosensitive member; an intermediate transferring member to which a plurality of developed visual images on the photosensitive member are transferred; registration-position-detecting means for reading the image patterns formed on the intermediate transferring member and detecting registration positions of images of the light beams; detecting means for detecting central positions between registration-position-detecting image patterns formed by two light beams of each of the optical systems in the conveyance direction; control means for holding the plane phase of the rotational polygon mirror of each of the optical systems in a specific phase relation and rotating the polygon mirror; and correcting means for correcting a misregistration between the central positions of the registration-position-detecting image patterns formed by the two optical light beams of each of the optical systems.

Moreover, the present invention provides a method for correcting a color-misregistration in an image forming apparatus provided with a plurality of optical systems each having two light-beam generating means, a photosensitive member on whose surface a latent image is formed using exposure with a light beam emitted from the light-beam generating means in each of the optical systems, a single rotational polygon mirror for each of the optical systems to make the light beams emitted from two light-beam generating means of each of the optical systems deflect and scan different surfaces of the photosensitive member in directions opposite to each other at the same time, developing means for visualizing the latent image on the photosensitive member, and an intermediate transferring member to which a plurality of developed visual images on the photosensitive member are transferred, the method including: reading image patterns formed on the intermediate transferring member and detecting registration positions of images of the light beams; detecting central positions between registration-position-detecting image patterns formed by two light beams of each of the optical systems in the conveyance direction; holding the plane phase of the rotational polygon mirror of each of the optical systems in a specified phase relation and rotating the polygon mirror; and correcting a misregistration between the central positions of registration-position-detecting image patterns formed by two light beams of each of the optical systems.

Other objects, configurations, and advantages of the present invention will become more apparent from the following detailed description and the accompanying drawings.

DESCRIPTION OF THE PREFERRED EMBODIMENTS

Embodiments of the present invention will be described below with reference to the accompanying drawings.

Embodiment 1

A first embodiment of the present invention will be described below.

Figure 1:
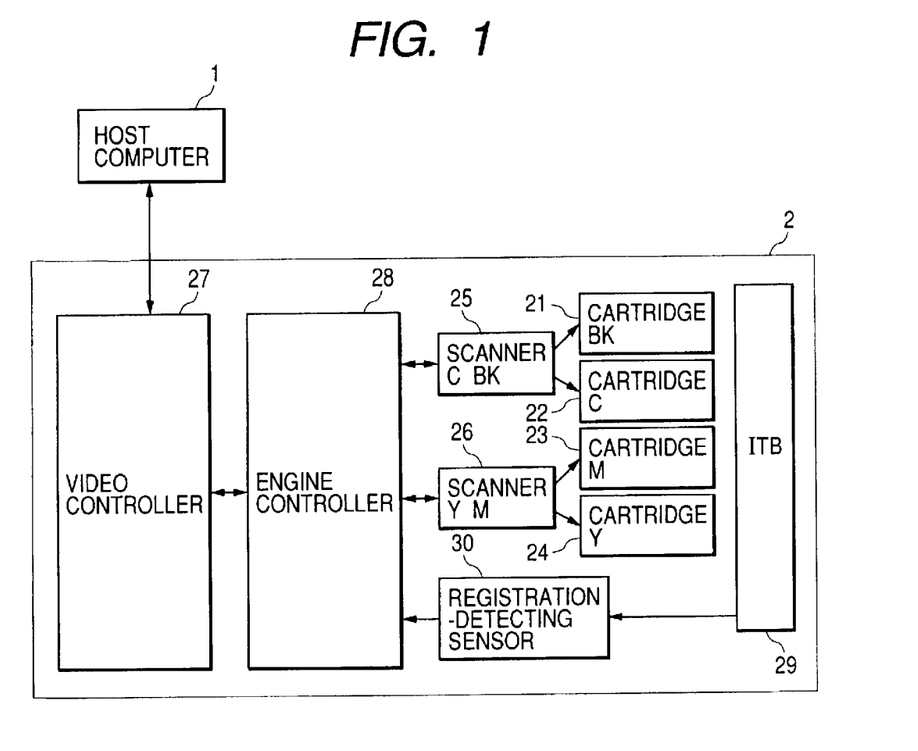
FIG. 1 is a block diagram showing a configuration of a system of an embodiment of the present invention.

FIG. 1 is a block diagram showing a system configuration of an embodiment of the present invention, in which a main configuration of a color laser printer 2 which is an electrophotographic image-forming apparatus connected with a host computer 1 serving as an external unit is shown.

The color laser printer 2 of this system is a four-drum system having four image-forming portions for four colors in which a color image is formed by superimposing images of four colors (yellow Y, magenta M, cyan C, and black BK).

The image-forming portions are constituted of toner cartridges 21 to 24 each having a photosensitive drum serving as an image-bearing member and scanner units 25 and 26 each having a laser diode for generating a laser beam serving as an image-exposing light source. The toner cartridges 21 to 24 each have a toner for each of the four colors, and two scanner units (25 and 26) are used in total, one being common to yellow and magenta, the other being common to cyan and black. The scanner units will be described later in detail.

Image data is sent out from the host computer 1 and then developed into bit map data by a video controller 27 in the color laser printer 2 to generate an image-forming video signal. The video controller 27 and an engine controller 28 perform serial communication each other to transmit and receive information. Moreover, the video signal is transmitted to the engine controller 28, and the engine controller 28 drives laser diodes (not shown) in the scanner units 25 and 26 in accordance with the transmitted video signal and forms an image on photosensitive drums (not shown) in the toner cartridges 21 to 24 respectively.

The photosensitive drums are in contact with an intermediate transferring belt (ITB) 29 and images formed on photosensitive drums of various colors are transferred onto the intermediate transferring belt 29 and successively superimposed and thereby, a color image is formed. The process for forming an image will be described later in detail.

Moreover, the registration position of image on the intermediate transferring belt 29 is monitored by a registration-position-detecting sensor 30.

Figure 2:
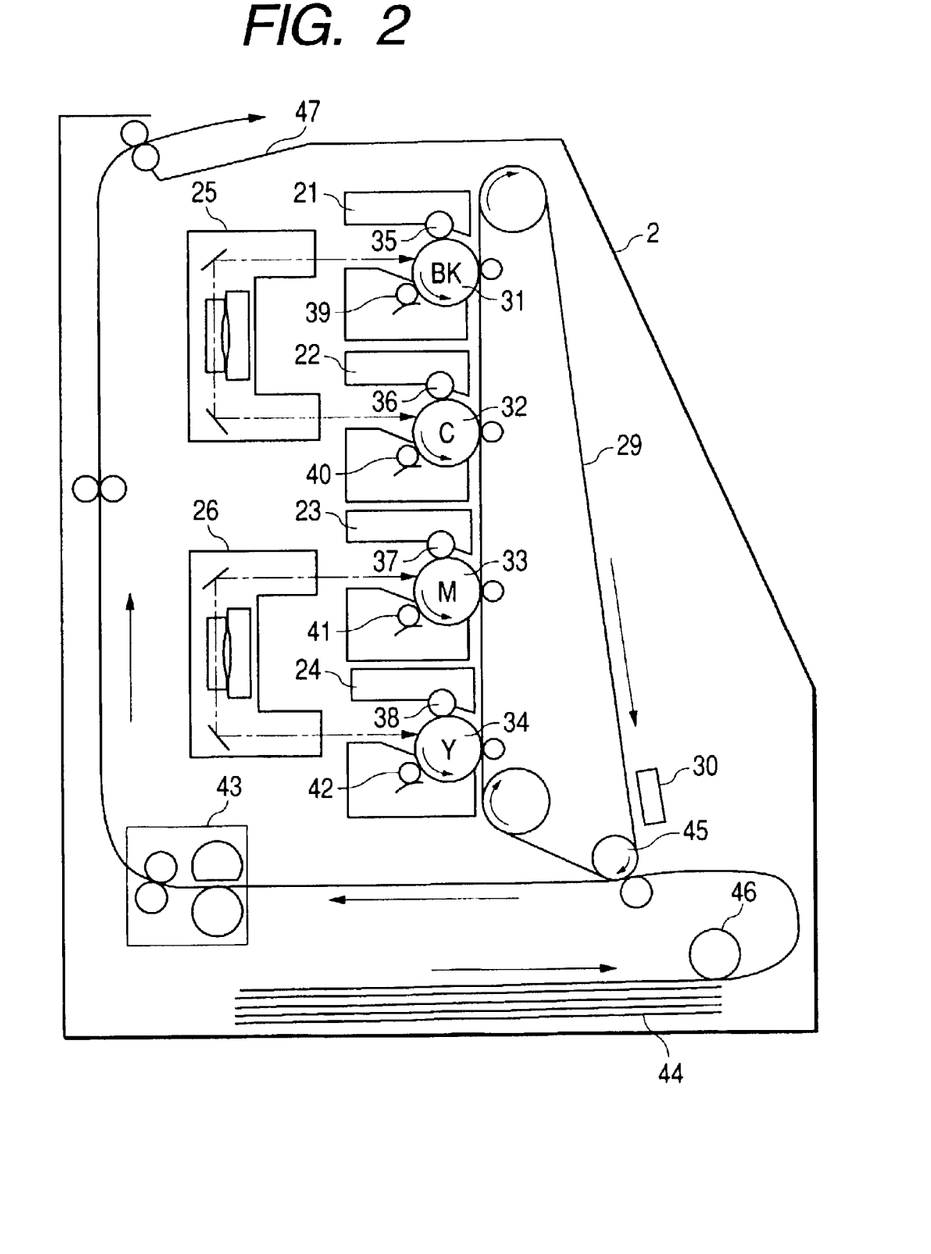
FIG. 2 is a sectional view showing a configuration of a color laser printer of the embodiment.

FIG. 2 is a sectional view showing a configuration of the above color laser printer, in which a component same as that in FIG. 1 is provided with the same symbol. The video controller 27 and engine controller 28 described for FIG. 1 are not illustrated.

In FIG. 2, reference numerals 31 to 34 denote photosensitive drums in which the photosensitive drum 31 is used to form a black image, the photosensitive drum 32 is used to form a cyan image, the photosensitive drum 33 is used to form a magenta image, and the photosensitive drum 34 is used to form a yellow image. Similarly, numerals 35 to 38 denote charging rollers, 39 to 42 denote developing units (developing means), 43 denotes a fixing unit, 44 denotes a sheet serving as recording paper, 45 denotes a transferring roller, 46 denotes a pickup roller for taking out the sheet 44, and 47 denotes a paper-discharging tray.

Figure 3:
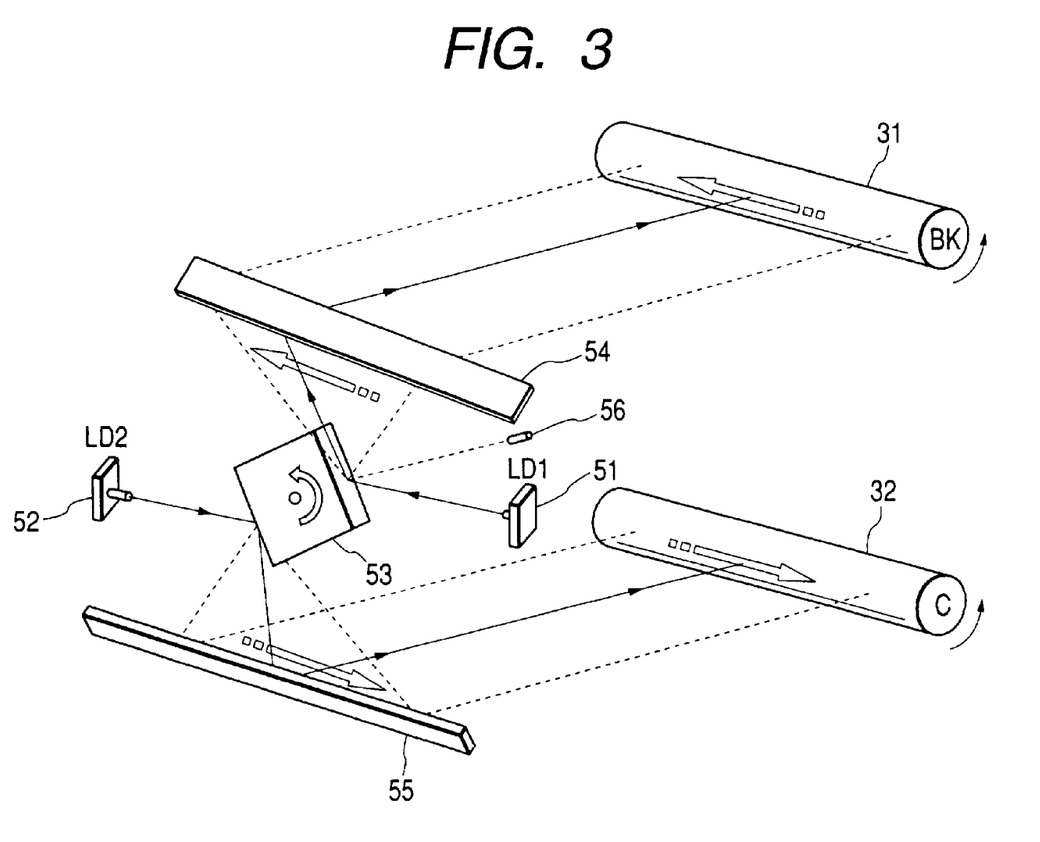
FIG. 3 is a perspective view showing a detailed configuration of a scanner unit of the embodiment.

FIG. 3 is an illustration showing detailed configurations of the above scanner units 25 and 26 constituting an optical system. In this case, though the configuration of the scanner unit 25 is described below for convenience sake, the scanner unit 26 also has the same configuration.

In FIG. 3, numerals 51 and 52 denote two laser diodes (LD1 and LD2) serving as laser-beam generating means which are driven and controlled in accordance with a control signal output from the engine controller 28. Numeral 53 denotes a single polygon mirror (rotational polygon mirror) in each optical system, which is rotated at a constant speed in the direction of the arrow in FIG. 3 by a not-shown scanner motor to scan the photosensitive drums 31 and 32 while reflecting laser beams emitted from the LD1 and LD2.

In this embodiment, a laser beam emitted from the LD1 is applied to the polygon mirror 53 from the right side in the drawing and a laser beam emitted from the LD2 is applied to the polygon mirror 53 at the same time from the left side in the drawing. Moreover, the laser beams reflected from the polygon mirror 53 are further reflected from return mirrors 54 and 55 to scan the photosensitive drums 31 and 32 in directions (from right to left and from left to right) of the arrows in FIG. 3.

Numeral 56 denotes a Beam Detect (BD) sensor (optical sensor) present on a scanning path of the LD1 to generate a signal when a laser beam comes in. The BD sensor 56 is present only on the scanning path of the LD1 but it is not present on the scanning path of the LD2.

In fact, though the above laser beam passes through various lenses to focus on the photosensitive drums or to convert the laser beam from a diffused ray into parallel ray, description is omitted.

The LD1 emits a laser beam modulated by a video signal generated by the video controller 27 in FIG. 1 and the laser beam scans the surface of the photosensitive drum 31.

On the other hand, the photosensitive drum 31 is rotated at a constant speed by a not-shown drum motor in the direction of the arrow shown in FIG. 3. The surface of the photosensitive drum 31 is electrically charged uniformly by the charging roller 35 shown in FIG. 2 and an invisible electrostatic latent image is formed on the surface when a laser beam modulated by a video signal generated by the above video controller 27 scans the surface of the drum 31. Moreover, the electrostatic latent image is visualized as a toner image by the developing unit 39 shown in FIG. 2.

Usually, the video controller 27 detects an output signal of the BD sensor 56 and after a predetermined time, transmits a video signal to the engine controller 28. Thereby, write-start positions of images by a laser beam on a photosensitive drum are always coincided with each other.

On the other hand, also in the case of the LD2, an electrostatic latent image is formed on the photosensitive drum 32 in the same manner as the case of the LD1. Then, the latent image is visualized as a toner image by the developing unit 40.

Because the BD sensor 56 is not present on the scanning path of the LD2, a video signal is transmitted to the engine controller 28 a predetermined time after the BD signal is output from the LD1. Thereby, write-start positions by a laser beam on the photosensitive drum 32 are always coincided with each other.

Thus, a color image of black (BK) is formed on the photosensitive drum 31 by the LD1 and a color image of cyan (C) is formed on the photosensitive drum 32 by the LD2.

Though the scanner unit 25 in FIG. 2 is described above, the same is also applied to the scanner unit 26. That is, a color image of magenta (M) is formed on the photosensitive drum 33 and a color image of yellow (Y) is formed on the photosensitive drum 34.

Moreover, the above color images are successively transferred onto the endless intermediate transferring belt 29 conveyed at a constant speed (primary transfer) so that they are superimposed each other. That is, the image of yellow (Y) is first transferred onto the intermediate transferring belt 29 and images of magenta (M), cyan (C) and black (BK) are successively transferred on to the yellow image and thereby, a color image is formed.

The color image formed on the intermediate transferring belt 29 is conveyed by the intermediate transferring belt 29. The sheet 44 in the cassette is picked up by the pickup roller 46 at the position of the transferring roller 45 so that the sheet 44 coincides with the image on the intermediate transferring belt 29 at the same timing. Then, the color image on the intermediate transferring belt 29 is pressed by the transferring roller 45 and transferred from the intermediate transferring belt 29 toward the sheet 44 (secondary transfer). The sheet 44 to which the color image is transferred and fixed by heat and pressure of the fixing unit 43 is then discharged to the discharging tray 47 on the upper portion of the printer body.

A series of image-forming processes is described above. Then, functions of the registration-position-detecting sensor 30 will be described below.

The registration-position detecting sensor 30 reads positions of color images formed on the intermediate transferring belt 29 at the setting position shown in FIG. 2 and feeds back the data to the video controller 27 or engine controller 28. Thereby, it is possible to adjust the image registration position of each color and prevent color misregistration.

Moreover, the registration-position-detecting sensor 30 reads a registration-position-detecting image pattern formed on the intermediate transferring belt 29 and detects the registration position of the image of a laser beam. Then, the engine controller (detecting means or correcting means) 28 detects a central position between the registration-position-detecting image patterns formed by two laser beams in the conveyance direction and corrects a misregistration between the central positions.

Figure 4:
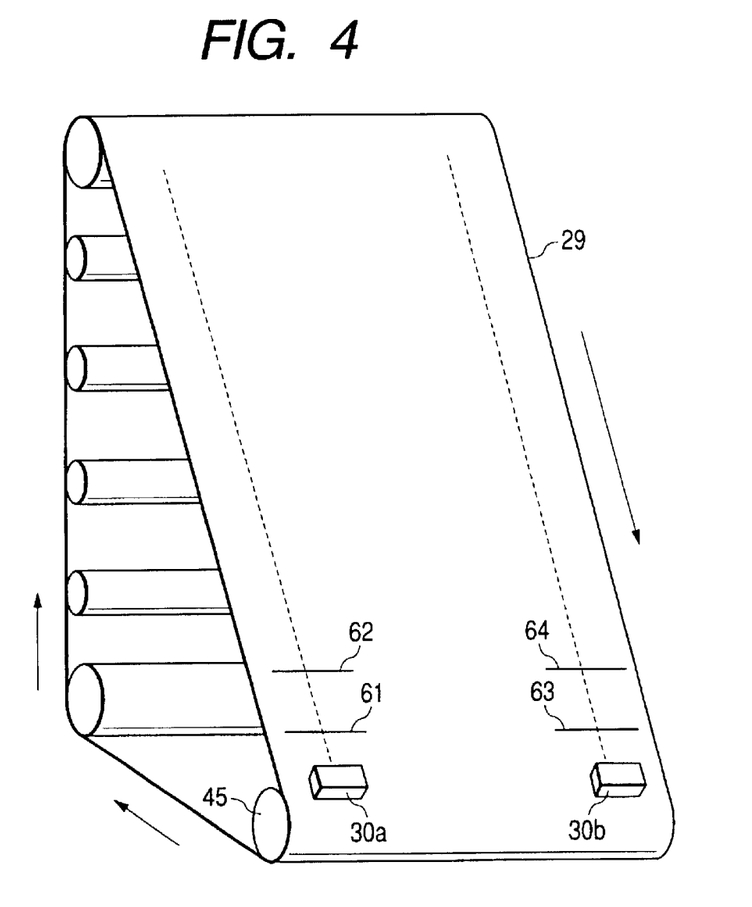
FIG. 4 is a perspective view showing a shape of an intermediate-transferring belt of the embodiment.

FIG. 4 is an illustration showing a shape of the intermediate transferring belt 29 extracted from FIG. 2. As shown in FIG. 4, numerals 30a and 30b denote two registration-position-detecting sensors. Two sensors are used in order to correct a main-scanning magnification or detect a conveyance-directional registration position at two places. The details are omitted. Numerals 61, 62, 63, and 64 respectively show the detecting position of each color.

Figure 5:
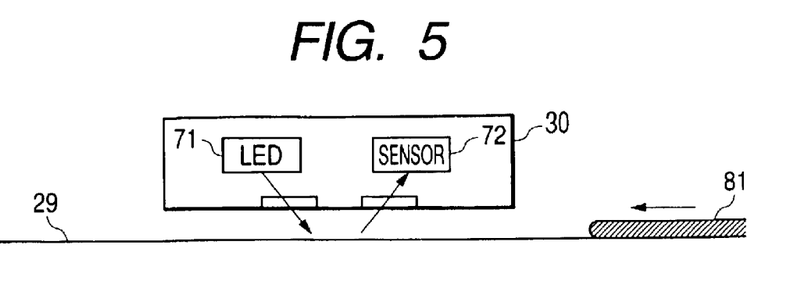
FIG. 5 is an illustration showing a structure of a registration-position-detecting sensor of an embodiment 1.

The above registration-position detecting sensor 30 is a sensor widely used for the so-called in-line-type color laser printer in which images of four colors are formed on four independent photosensitive drums respectively and a color image is formed by superimposing the four color images each other. FIG. 5 shows the structure of the registration-position-detecting sensor 30.

The registration-position-detecting sensor 30 is constituted of an LED 71 serving as a light-emitting portion and a light sensor 72 serving as a light-receiving portion. In the sensor 30, the quantity of the light which is emitted from the LED 71 and then reflected on the intermediate-transferring belt 29 is detected by the light sensor 72. Moreover, the sensor 30 detects a difference between the quantity of the light reflected from the intermediate transferring belt 29 on which a toner image 81 is not formed and the quantity of the light reflected from the toner image 81 on the intermediate transferring belt 29 and detects the registration position of the toner image 81 in accordance with the detected timing and the conveyance speed of the intermediate transferring belt 29.

Figure 6:
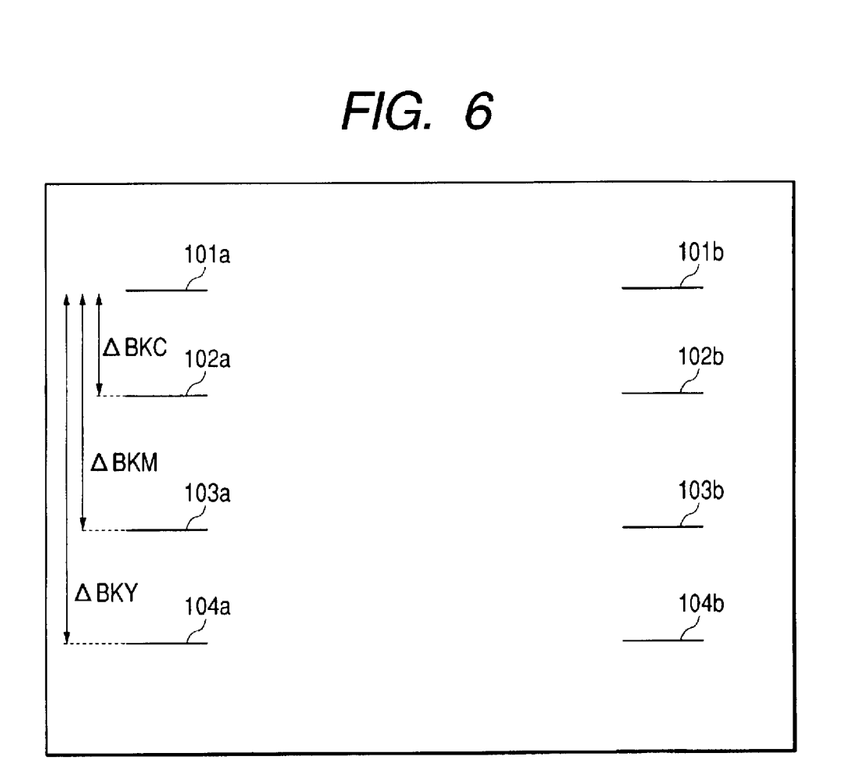
FIG. 6 is an illustration showing a registration-position-detecting image pattern of the embodiment 1.

Then, a method of detecting the conveyance-directional registration position of the intermediate transferring belt 29 and correcting color misregistration is described below. FIG. 6 is an illustration showing a registration-position-detecting image pattern of this embodiment.

Black (BK) patterns 101a and 101b, cyan (C) patterns 102a and 102b, magenta (M) patterns 103a and 103b, and yellow (Y) patterns 104a and 104b are drawn as transverse lines one line by one line for each color at the right and left registration-detecting positions on the intermediate transferring belt 29. It is enough to examine the timing for detecting these registration-position-detecting image patters by the above registration-position detecting sensor 30 and it is possible to detect the conveyance-directional misregistration value or amount of an image depending on whether these patterns are detected earlier or later than a predetermined timing.

Then, a method of correcting a conveyance-directional misregistration on the basis of a color misregistration amount detected in accordance with the above method will be described below. Here, such a case as to correct the color misregistration on the basis of the black (BK) pattern 101a will be described.

The misregistration amount ΔBKC between the black (BK) pattern 101a and cyan (C) pattern 102a is detected to advance the write-start timing of a cyan (C) image by the number of lines corresponding to the misregistration value ΔBKC. In this case, write-start timings of black (BK) and cyan (C) are specified in accordance with the same output of the BD sensor 56. Therefore, the color misregistration between black (BK) and cyan (C) can be corrected only every line (by one-line unit). Therefore, the color misregistration amount between the both in the conveyance direction is present up to an amount equivalent to one line. The above accuracy depends on mechanical position accuracies of black (BK) and cyan (C).

Moreover, the conveyance-directional color misregistration amount ΔBKM between black (BK) as a reference color and magenta (M) or the conveyance-directional color misregistration amount ΔBKY between black (BK) and yellow (Y) is corrected as described below. Because black (BK) and magenta (M) or yellow (Y) are scanned by separate scanners, it is possible to also correct a color misregistration within one line by controlling the plane phase of the polygon mirror 53.

However, because magenta (M) and yellow (Y) are scanned by the same scanner, it is impossible to individually correct the color misregistration between magenta (M) and black (BK) and the color misregistration between yellow (Y) and black (BK). Therefore, to minimize color misregistrations between four colors such as black (BK), cyan (C), magenta (M), and yellow (Y), this embodiment corrects a color misregistration so that a misregistration amount between the conveyance-directional central position in the color misregistration between black (BK) and cyan (C) and the conveyance-directional central position in the color misregistration between magenta (M) and yellow (Y) is minimized. Then, the color-misregistration correcting method is described below by referring to FIG. 7.

Even after correcting the color misregistration between black (BK) and cyan (C) in accordance with the above method, a color misregistration within one line is left. When assuming the color misregistration amount of the position 115 of a cyan (C) image 112 from the reference position 113 of a black (BK) image 111 as shown FIG. 7 as δBKC, the position 111 of black (BK)+the position 114 of δBKC/2 is set as the reference position of a first scanner.

Figure 7:
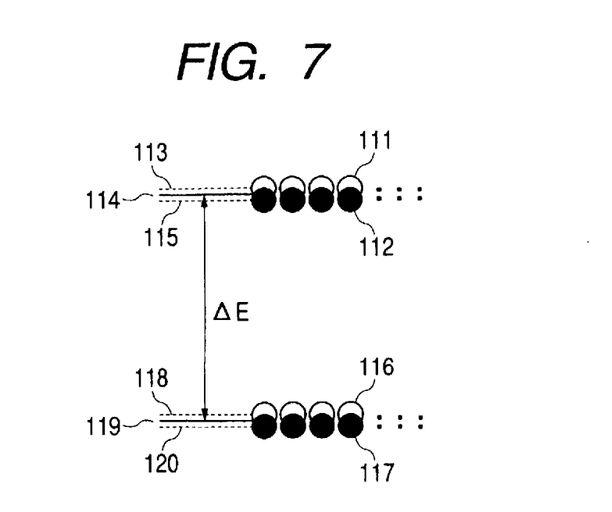
FIG. 7 is an illustration showing a color misregistration correcting method of the embodiment 1.

Moreover, when correcting the color misregistration of yellow (Y) every line (by one-line unit) on the basis of magenta (M), a color misregistration of less than one line is left. When assuming the color misregistration amount of the position 120 of a yellow (Y) image 117 from the reference position 118 of a magenta (M) image 116 as δMY, it is possible to set the position 118 of magenta (M)+the position 119 of δMY/2 as the reference position of a second scanner.

In this case, the misregistration amount LE between the reference positions of the first and second scanners is calculated again in order to bring the both reference positions to the same position in the conveyance direction. A misregistration amount every line of the misregistration amount ΔE can be corrected by changing the number of lines of the write-start timing between black (BK) and magenta (M). Remaining misregistration amounts of less than one line can be corrected by changing plane phases of the scanners.

Figure 8:
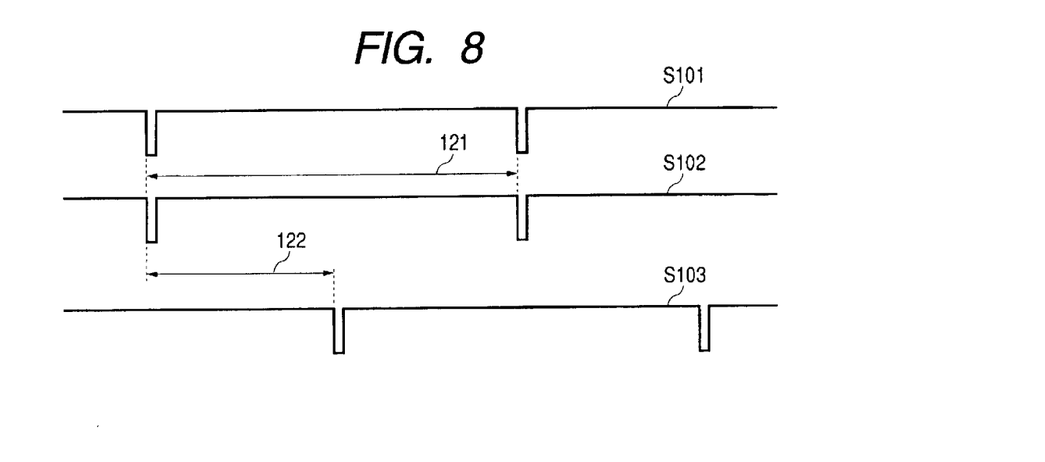
FIG. 8 is a timing chart showing a color misregistration correction control by the embodiment 1.

FIG. 8 shows a correcting method when a misregistration amount of less than one line between the both positions corresponds to ½ line. When the misregistration amount is equal to ½ line, it is allowed to perform control in accordance with a phase 122 shifted by a ½-BD cycle from the plane phase 121 of the polygon mirror 53 in a first station. To realize the above mentioned, it is allowed to use a signal having a phase delayed by 180° from reference signals S101 and S102 for PLL control of a first scanner motor as a reference signal S103 for PLL control of a second scanner motor.

By performing the above control, an image is formed without causing the color misregistration between the conveyance-directional central position of black (BK) and cyan (C) scanned by the first scanner and the conveyance-directional central position of magenta (M) and yellow (Y) scanned by the second scanner. According to this method, it is possible to accurately correct color misregistrations between four colors in the conveyance direction.

Figure 9:
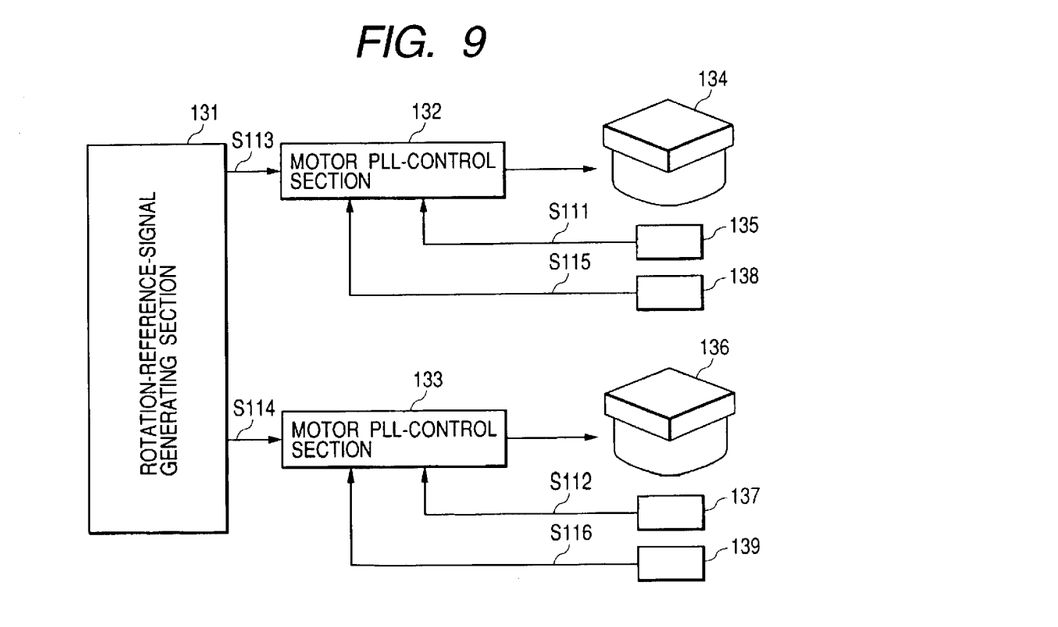
FIG. 9 is a block diagram showing a configuration of a scanner motor control circuit of the embodiment 1.

FIG. 9 is a block diagram showing a configuration of the scanner motor control circuit of this embodiment. A rotation-reference-signal generating portion 131 generates rotation reference signals S113 and S114 having phases different from each other every BD cycle and outputs the signals S113 and S114 to a first motor PLL-control portion 132 and a second motor PLL-control portion 133 which serve as PLL control means of the polygon mirror 53 respectively.

The first motor PLL-control portion 132 controls a first scanner motor 134 in accordance with an FG signal S111 of an FG generator 135 and the above rotation reference signal S113. In this case, PLL control is performed so that the phase of the rotation reference signal S113 coincides with that of a BD signal S115 of a BD sensor 138.

The second motor PLL-control portion 133 controls a second scanner motor 136 in accordance with an FG signal S112 of an FG generator 137 and the above rotation reference signal S114. In this case, PLL control is performed so that the phase of the rotation reference signal S114 coincides with that of a BD signal S116 of a BD sensor 139.

Figure 10:
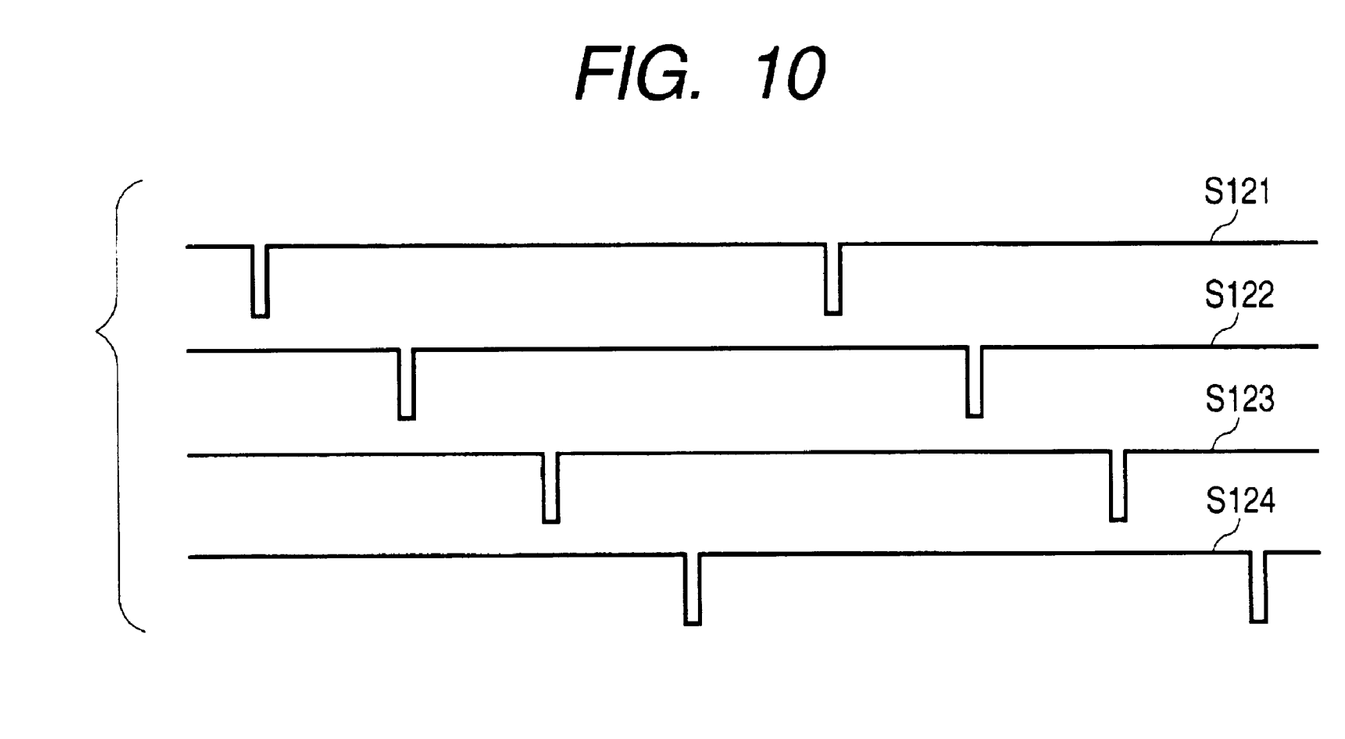
FIG. 10 is a timing chart showing a rotation reference signal in the embodiment 1.

FIG. 10 is a timing chart showing a rotation reference signal. As shown in FIG. 10, there are four types of rotation reference signals S121, S122, S123, and S124 having the same BD cycle and different phases. And, in accordance with the conveyance-directional color misregistrations between black (BK) and cyan (C) scanned by the above described first scanner and between magenta (M) and yellow (Y) scanned by the above described second scanner, any of these rotation reference signals S121, S122, S123, and S124 is used as the rotation reference signals S113 and S114 of the above first and second scanner motors.

In the case of this embodiment, an example is shown in which four rotation reference signals having phases different from each other by 90° are used. In this case, it is possible to correct a color misregistration every ¼ line. The number of rotation reference signals is not restricted to four. It is possible to further decrease the unit for correction of color misregistration by using more rotation reference signals having phases different from each other.

In this embodiment, a method is shown in which a color misregistration amount is corrected in accordance with the information on the left-hand registration-position-detecting image patterns. However, it is also allowed to correct a color misregistration amount in accordance with the average position of right and left registration-position-detecting image patterns in the conveyance direction.

Though an example of one transverse line is shown as a registration-position-detecting image pattern, any pattern can be used as long as it can detect a conveyance-directional color misregistration, and therefore, there is no limitation on the registration-position-detecting image pattern.

Figure 11:
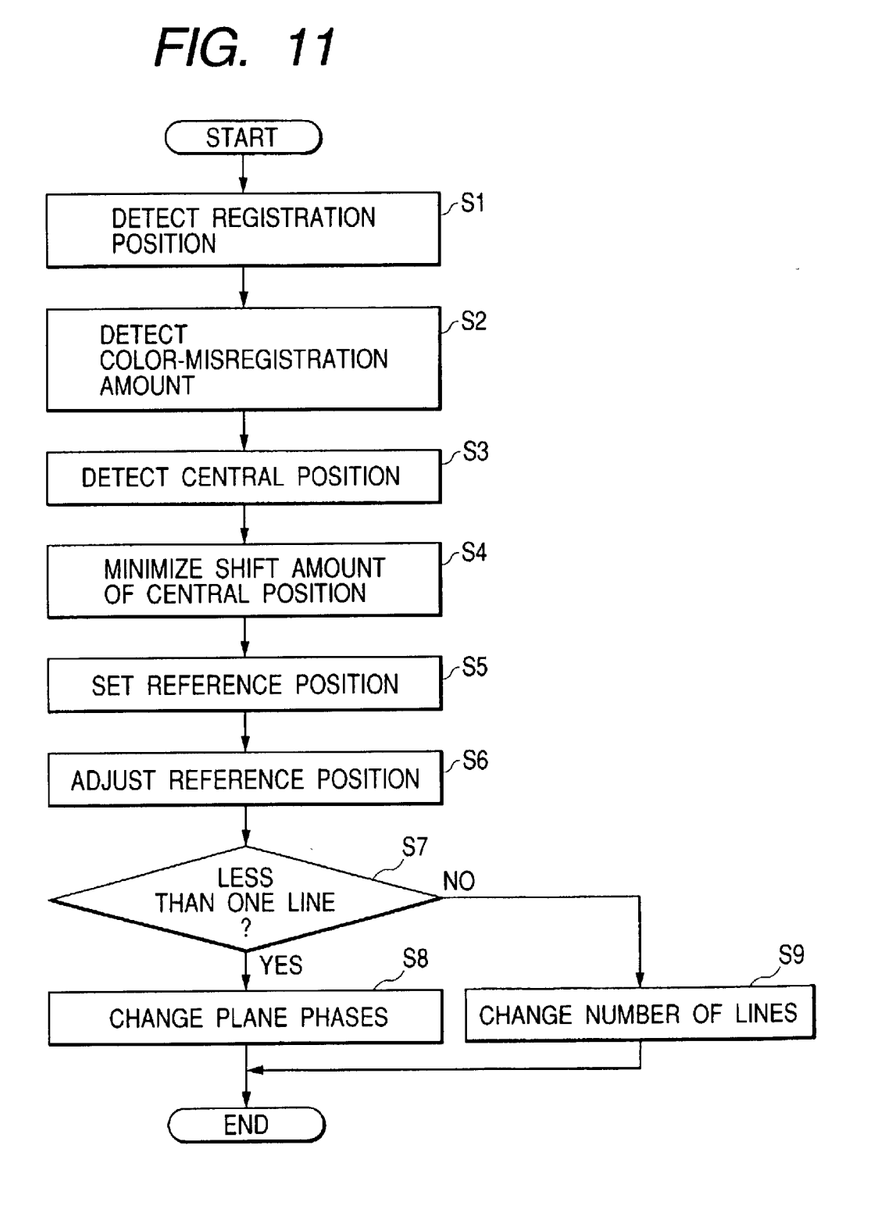
FIG. 11 is a flowchart showing a color-misregistration correcting operation of the embodiment 1.

FIG. 11 is a flowchart showing the color-misregistration operation of this embodiment. The control shown in this flowchart is executed by a program previously stored by the CPU in the engine controller 28.

First, a registration position is detected (S1) as described above to detect a color misregistration (S2). Then, the central position of the conveyance-directional color misregistration between black (BK) and cyan (C) and the central position of the conveyance-directional color misregistration between magenta (M) and yellow (Y) are detected (S3) to correct a color misregistration so that the misregistration amount between the central positions is minimized (S4).

Then, the reference position of a first scanner and that of a second scanner are set (S5) to adjust the reference positions so that the positions are brought to the same position (S6). In this case, when the misregistration amount between the both positions is less than one line, (S7), the plane phase of the scanner is changed (S8). However, when the misregistration amount is equal to or more than one line (S7), the number of lines for the write-start timing between black (BK) and magenta (M) is changed (S9).

Thus, according to the configuration of this embodiment, it is possible to delete scanner motors and BD sensors of second and fourth stations and cut down the cost.

Moreover, because the plane phase of the polygon mirror 53 is controlled so that the difference between the central value of first and second laser beams in the conveyance direction and the central value of third and fourth laser beams in the conveyance direction are made smaller, it is possible to decrease conveyance-directional color misregistrations between all colors even when the conveyance-directional misregistration amount between two laser beams allowed to scan by the same polygon mirror 53 is comparatively large.

Embodiment 2

A second embodiment of the present invention will be described below.

Figure 12:
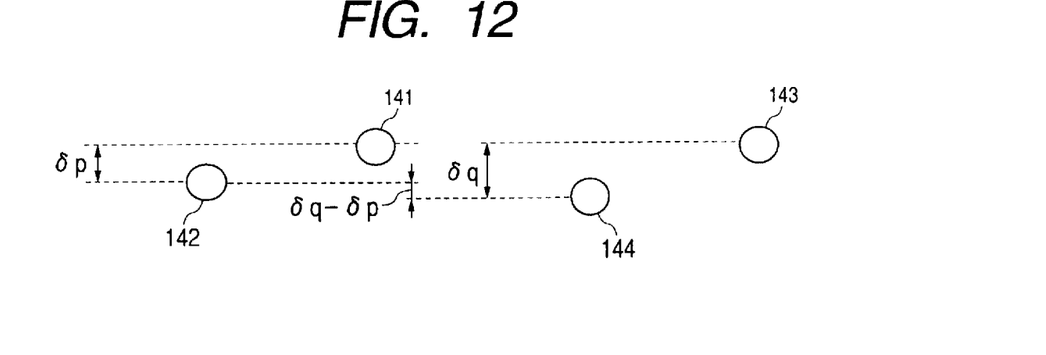
FIG. 12 is an illustration showing lines of a scanner in an embodiment 2.

In this embodiment, a case is described in which a multiple-beam laser diode having a plurality of light-emitting sources is used. FIG. 12 is an illustration showing lines of scanners in this embodiment, in which the interval in the conveyance direction between lines drawn by first and second laser beams is shown when scanning is performed by a multiple-beam laser diode having two light-emitting sources.

Because of problems on mechanical assembling and adjustment, an error of several microns (μm)(δq−δp) is produced between the line interval of a first scanner and that of a second scanner as shown in FIG. 12. In this case, by detecting the conveyance-directional misregistration value between either first beams or second beams and controlling the rotation of first and second scanner motors so as to correct the misregistration amount, a line is drawn with no misregistration by first or second laser in the conveyance direction, but by lasers other than the reference one a line is always drawn with a misregistration of δq–δp left.

Therefore, in this embodiment, the conveyance-directional central position of a plurality of laser beams is detected and used as a reference position for correcting a color misregistration. A method for detecting the central position of a plurality of beams is described below by referring to FIG. 12.

In this case, when a registration-position-detecting image pattern is drawn on the intermediate transferring belt 29 shown in FIG. 6, it is done using first and second multiple laser beams. Then, to detect a conveyance-directional registration position, the central position of the registration-position-detecting image pattern is detected. Thus, it is possible to use the central position of a plurality of multiple beam lasers as the reference position for registration-position detection.

A line thickness and a pattern when drawing a registration-position-detecting image pattern are not restricted to the method described for this embodiment. It is possible to use any line thickness and pattern as long as the central position of a plurality of lasers can be used as the reference position for registration-position detection.

Moreover, because the subsequent color misregistration correction is the same as the method described for the first embodiment, the description is omitted.

Embodiment 3

A third embodiment of the present invention will be described below.

In the case of this embodiment, a method is described which performs the PLL control of a scanner motor by using a BD signal output from a BD sensor without having an FG generating portion in a scanner motor. Moreover, the description of a method for correcting a color misregistration by detecting the registration position is omitted because the method is the same as the method described for the first or second embodiment.

Figure 13:
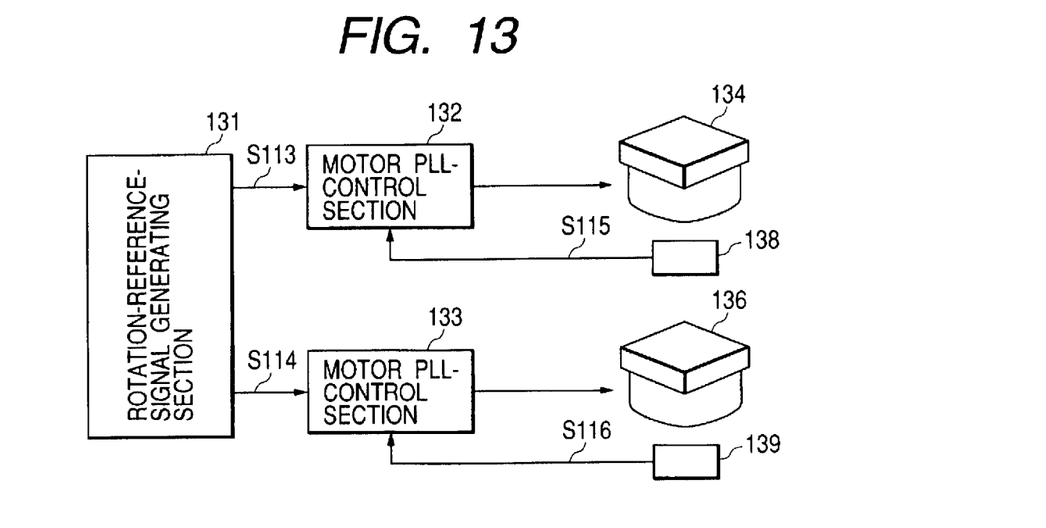
FIG. 13 is a block diagram showing a configuration of a scanner motor control circuit of an embodiment 3.

FIG. 13 is a block diagram showing a configuration of the scanner motor control circuit of this embodiment, in which the same component as that in FIG. 9 is provided with the same symbol. In the case of this embodiment, an FG generation portion is not present in a scanner motor.

A rotation-reference-signal generating portion 131 generates rotation reference signals S113 and S114 having the same cycle as the BD cycle and having phases different from each other and outputs the signals S113 and S114 to first motor PLL-control portion 132 and second motor PLL-control portion 133 respectively.

The first motor PLL-control portion 132 controls a first scanner motor 134 in accordance with a BD signal S115 of a BD sensor 138 and the above rotation reference signal S113. In this case, PLL control is performed so that the phase of the rotation reference signal S113 coincides with the phase of the BD signal S115 of the BD sensor 138.

The second motor PLL-control portion 133 controls the second scanner motor 136 in accordance with the BD signal S116 of the BD sensor 139 and the above rotation reference signal S114. In this case, PLL control is performed so that the phase of the rotation reference signal S114 coincides with the phase of the BD signal S116 of the BD sensor 139.

According to the embodiments described above, it is possible to accurately correct the color misregistration between the colors in the conveyance direction.

Moreover, in the case of an image forming apparatus provided with a multiple-beam laser diode having a plurality of light sources, it is possible to accurately correct the color misregistration between the colors in the conveyance direction.

Furthermore, by using an output from a conventional BD sensor as a rotational-position-detecting signal of a scanner motor, it is possible to delete an FG-signal generating portion and cut down the cost.

The present invention is described above in accordance with several preferred embodiments. However, the present invention is not restricted to the embodiments. It is needless to say that various modifications and applications are allowed within the scope of claims.

What is claimed is:

1. An image forming apparatus comprising:
   a first optical system comprising a first light beam generator, a second light beam generator, and a first scanner adapted to scan a first photosensitive member with a light beam from said first light beam generator to form a first color image on the first photosensitive member and to scan a second photosensitive member with a light beam from said second light beam generator to form a second color image on the second photosensitive member;
   a second optical system comprising a third light beam generator, a fourth light beam generator, and a second scanner adapted to scan a third photosensitive member with a light beam from said third light beam generator to form a third color image on the third photosensitive member and to scan a fourth photosensitive member with a light beam from said fourth light beam generator to form a fourth color image on the fourth photosensitive member;
   a transfer unit adapted to transfer images formed on each photosensitive member to a common transfer medium;
   a control unit adapted to control each of said light beam generators to form a pattern for correcting a color mis-registration;
   a position detector capable of detecting a position in a conveyance direction of patterns formed by each of the light beam generators, even where the position is less than one scan line; and
   a correcting unit adapted to correct a color mis-registration whose magnitude is less than one scan line in a conveyance direction by adjusting a relational phase of said first scanner and said second scanner according to detection results of said position detector.

2. An image forming apparatus according to claim 1, wherein said correcting unit adjusts the relational phase of said first scanner and said second scanner according to detection results of said position detector such that a central position of a scan line of the light beam from said first light beam generator and a scan line of the light beam from said second light beam generator matches a central position of a scan line of the light beam from said third light beam generator and a scan line of the light beam from said fourth light beam generator.

3. An image forming apparatus according to claim 1, wherein each of said scanners comprises a rotational mirror for reflecting the light beams, a motor for rotating said rotational mirror, and a motor control unit for controlling said motor.

4. An image forming apparatus according to claim 3, wherein said motor control unit PLL-controls said motor.

5. An image forming apparatus according to claim 3, wherein said motor control unit controls said motor based on a beam detection signal output from a beam detector for detecting a light beam scanned by the scanner to which that motor belongs.

6. An image forming apparatus according to claim 1, wherein the patterns are images having a predetermined line width extending in a main-scanning direction.

7. An image forming apparatus according to claim 1, wherein said transfer unit transfers images formed respectively on one of the photosensitive members to an intermediate transferring medium, and transfer images on the intermediate transferring medium to a sheet, and wherein said position detector detects a position of patterns on the intermediate transferring medium.

8. An image forming apparatus according to claim 1, wherein said light beam generators generate a plurality of light beams.

9. A method for correcting a color mis-registration in an image forming apparatus that includes a first optical system comprising a first light beam generator, a second light beam generator, and a first scanner adapted to scan a first photosensitive member with a light beams from the first light beam generator to form a first color image on the first photosensitive member and to scan a second photosensitive member with a light beam from the second light beam generator to form a second color image on the second photosensitive member; a second optical system comprising a third light beam generator, a fourth light beam generator, and a second scanner adapted to scan a third photosensitive member with a light beam from the third beam generator to form a third color image on the third photosensitive member and to scan a fourth photosensitive member with a light beam from the fourth light beam generator to form a fourth color image on the fourth photosensitive member; and a transfer unit adapted to transfer images formed on each photosensitive member to a common transfer medium, said method comprising the steps of:

controlling each of the light beam generators to form a pattern for correcting a color mis-registration;

detecting, using a position detector, a position in a conveyance direction of patterns formed by respective ones of the light beam generators, even where the position is less than one scan line; and correcting a color mis-registration whose magnitude is less than one scan line in the conveyance direction by adjusting a relational phase of the first scanner and the second scanner according to detection results obtained in said detecting step.

10. A method according to claim 9, wherein said correcting step includes adjusting the relational phase of the first scanner and the second scanner that a central position of a scan line of the first light beam and a scan line of the second light beam matches a central position of a scan line of the third light beam and a scan line of the fourth light beam.

11. A method according to claim 9, further comprising the step of transferring using a transfer unit, images formed respectively on one of the photosensitive members to an intermediate transferring medium, and transferring images on the intermediate transferring medium to a sheet, and wherein said detecting step includes detecting a position of patterns on the intermediate transferring medium.

12. A method according to claim 9, wherein the light beam generators generate a plurality of light beams.

* * * * *

UNITED STATES PATENT AND TRADEMARK OFFICE
CERTIFICATE OF CORRECTION

PATENT NO. : 7,071,957 B2
APPLICATION NO. : 10/245648
DATED : July 4, 2006
INVENTOR(S) : Akihiro Fujimoto It is certified that error appears in the above-identified patent and that said Letters Patent is hereby corrected as shown below:

COLUMN 1

Line 53, "signal" should read --signals--.

COLUMN 5

Line 17, "communication" should read --communication with--.

COLUMN 6

Line 58, "superimposed" should read --superimposed with--.

COLUMN 8

Line 1, "patters" should read --patterns--; and
Line 66, "amount LE" should read --amount $\Delta E$--.

COLUMN 9

Line 58, "above described" should read --above-described--.

COLUMN 13

Line 21, "beams" should read --beam--.

Signed and Sealed this

Thirtieth Day of January, 2007

JON W. DUDAS
*Director of the United States Patent and Trademark Office*